United States Patent [19]

Ishizaki et al.

[11] Patent Number: 4,637,249
[45] Date of Patent: Jan. 20, 1987

[54] BATTERY CAN HOLE DETECTING APPARATUS

[75] Inventors: Morio Ishizaki, Itami; Akiyoshi Nishikawa, Osaka, both of Japan

[73] Assignee: Ishizaki Press Kogyo Co., Ltd., Itami, Japan

[21] Appl. No.: 774,545

[22] Filed: Sep. 10, 1985

[30] Foreign Application Priority Data

Mar. 20, 1985 [JP] Japan .................................. 60-57014

[51] Int. Cl.⁴ ............................................. G01M 3/02
[52] U.S. Cl. ......................................... 73/41; 73/45; 73/45.1
[58] Field of Search ............................. 73/41, 45.1, 45

[56] References Cited

U.S. PATENT DOCUMENTS

| | | | |
|---|---|---|---|
| 3,413,841 | 12/1968 | Weber | 73/45.1 |
| 3,461,716 | 8/1969 | Thomson | 73/45.1 |
| 3,750,458 | 8/1973 | Messervey et al. | 73/45.1 |
| 3,785,195 | 1/1974 | Yasuhiro et al. | 73/45.1 |
| 4,019,370 | 4/1977 | Allocco, Jr. | 73/45.1 |
| 4,144,742 | 3/1979 | Schmidt et al. | 73/45.1 |
| 4,184,362 | 1/1980 | Standley et al. | 73/45.1 |
| 4,478,336 | 10/1984 | Thompson | 73/45.1 |

*Primary Examiner*—Stewart J. Levy
*Assistant Examiner*—Hezron E. Williams
*Attorney, Agent, or Firm*—W. G. Fasse; D. H. Kane, Jr.

[57] ABSTRACT

A battery can hole detecting apparatus detects whether or not battery cans formed by a drawing operation are defective and leak because a can has a hole. Battery cans which are continuously fed in are placed on the outer surface of a rotor and thereby carried to a first or second discharge port. During this movement, air is introduced into the inner space of such battery can to detect whether or not the battery can is leaking according to whether or not the pressure of the introduced air reaches a predetermined value. Battery cans which are not defective are discharged at a first discharge port, while battery cans which are defective are discharged at a second discharge port.

3 Claims, 8 Drawing Figures

FIG.8
(a)
(b) 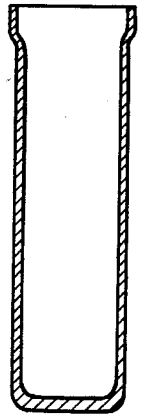 (c) 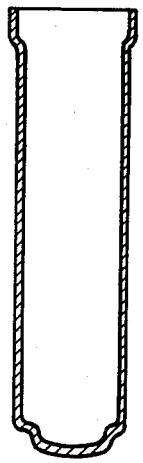 (d) 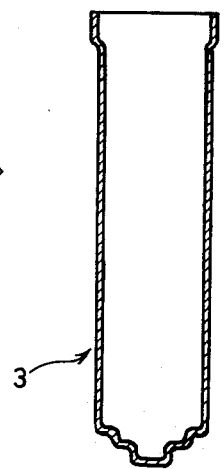

BATTERY CAN HOLE DETECTING APPARATUS

BACKGROUND OF THE INVENTION

1. Field of the Invention

This invention relates to a battery can hole detecting apparatus for examining whether or not battery cans formed by drawing are defective due to perforations.

2. Description of the Prior Art

FIG. 6 shows an example of a battery can which has heretofore been in use. The two parts 1 and 2 shown in FIG. 6 are members which constitute the anode section of a battery. One part 1 is a cylindrical member having a flat closed end and an open at the other end. The other part 2 constitutes an anode terminal to be fixedly attached to the closed end surface of the cylindrical member 1. In recent years, however, in order to reduce the number of parts to thereby improve workability and reduce cost and to make effective use of the space in the anode terminal member 2, there has been developed a one-piece battery can as shown in FIG. 7.

The battery can 3 shown in FIG. 7 is obtained by drawing a sheet material on a press. The battery can 3 constitutes the anode section of a battery, but it differs from the example shown in FIG. 6 in that it is formed as a single member. And the closed end has two projections constituting the anode terminal.

The battery can 3 shown in FIG. 7 is suitable for mass production but, on the other hand, it offers problems to be presently described. FIG. 8 shows the process for production of the battery can 3. Usually, the processing steps shown therein are performed on a single press. To obtain the shape of the battery can 3 shown in FIG. 7, the drawing operation is performed roughly in three stages. In the first stage, a sheet material shown at (a) is drawn to a shape shown at (b). The member (b) has a closed flat end. The second stage of drawing provides the shape shown at (c), whereby a single projection results. The final stage of drawing is then performed to provide a shape shown at (d) corresponding to the shape shown in FIG. 7, wherein the can 3 has two projections constituting anode terminal of a battery.

As described above, to obtain the battery can 3 of the shape shown in FIG. 7, a substantial amount of drawing has to be performed. This means rather a radical drawing operation on the blank. As considered from the present level of press technology, it would be difficult to produce battery cans by deep drawing with high accuracy without involving any rejects. In other words, some of the deep drawn battery cans 3, though very few, may have holes resulting from deep drawing. In this connection, it is to be understood that the word "holes" as used herein refers not only to literal holes but also to breaks, cracks, etc. Such holes often form in the corners of the projections at the closed end of the battery can 3. If a battery can, while retaining holes, is assembled as a final product, a electrolytic solution would leak through the holes, thereby making a product unusable. Therefore, it is necessary to withdraw defective battery cans from production to ensure that defective products do not appear on the market.

However, the size of holes resulting from drawing is very small and, moreover, oil has adhered to the products. As a result, holes can hardly be found visually. Further, the number of battery cans formed by drawing is so large that it is practically impossible for the operator to visually inspect battery cans one by one to find holes therein.

For this reason, there is no way but a mechanical one to examine whether or not battery cans have holes. In order to improve the workability and increase the operating efficiency in the production process, it is preferable to examine battery cans as they are drawn on a press machine and delivered therefrom. To provide an operative association of the press and the hole detecting mechanism, it could be contemplated to operate the hole detecting mechanism with the same cycle time as that of the press. However, in a press, the cycle time required for drawing one battery can is very short. For example, it is 1 second per unit. In this case, battery cans will be fed to the hole detecting mechanism at a rate of one unit per second, but it is difficult to make a check in one second of whether or not a battery can has a hole.

For this reason, usually, the hole detecting mechanism would be separated from the press for performing the can hole detection separately from the drawing of the cans. However, it is desirable to perform a continuous detection of holes in battery cans as they successively come out of a press for increasing efficiency.

SUMMARY OF THE INVENTION

Accordingly, an object of this invention is to provide a battery can hole detecting apparatus which permits a continuous and reliable detection of whether or not battery cans drawn on a press are defective because they have holes. This detection shall be made as the cans come out of the press.

A battery can hole detecting apparatus according to this invention comprises a rotor, positioning means, clamp means, air introducing means, pressure switches, and clamp control means. Battery cans are continuously fed onto the outer rotor surface by a battery can feed port. The rotor carries the cans on its outer surface to a first or second discharge port. The positioning means are arranged at suitable intervals in the direction of rotation along the entire outer peripheral surface of the rotor for positioning battery cans fed onto the outer surface of the rotor at predetermined positions. The clamp means fixes a battery can positioned by the positioning means to prevent the battery can from moving relative to the rotor while closing the inner space of the battery can. The air introducing means introduces air into the inner space of a battery can fixed by the clamp means. Each pressure switch is adapted to be actuated when the pressure of air introduced into the inner space of a battery can reaches a predetermined value. The clamp control means controls the clamp means in such a manner that it releases the clamp means when the battery can reaches the first discharge port if the pressure switch has been actuated or releases it when the battery can reaches the second discharge port if the pressure switch has not been actuated.

Battery cans drawn on a press are successively fed and positioned onto the outer surface of the rotor, which carries the cans to the first or to the second discharge port. The clamp means hold the cans in place until the cans are to be discharged. Air is introduced into the battery cans on their way from the battery feed port to the first discharge port. If there is no hole in a battery can, the pressure of air introduced into the inner space thereof will reach a predetermined value, resulting in the pressure switch being actuated. In this case, the battery can is discharged at the first discharge port. On the other hand, if a battery can has a hole or holes the pressure of air introduced into the inner space of the battery can will not reach the predetermined value, so that the pressure switch will not be actuated. In this case, the battery can is discharged at the second discharge port.

As described above, according to this invention, battery cans are moved with the rotation of the rotor and whether or not the battery cans are holed is detected during their movement; therefore, a sufficient detection time can be assigned to each battery can. For example, even if battery cans are fed to the rotor at a rate of one unit per second, 5 seconds will be available for hole detection if it takes 5 seconds for each battery can to travel from the battery can feed port to the battery can discharge port. Therefore, according to this invention, even if the press has a very short cycle time, the detection of defective cans is easily made in a continuous operation.

These object and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a view schematically showing the process for producing the battery can of FIG. 7.

DESCRIPTION OF THE PREFERRED EMBODIMENTS AND OF THE BEST MODE OF THE INVENTION

Figure 1:
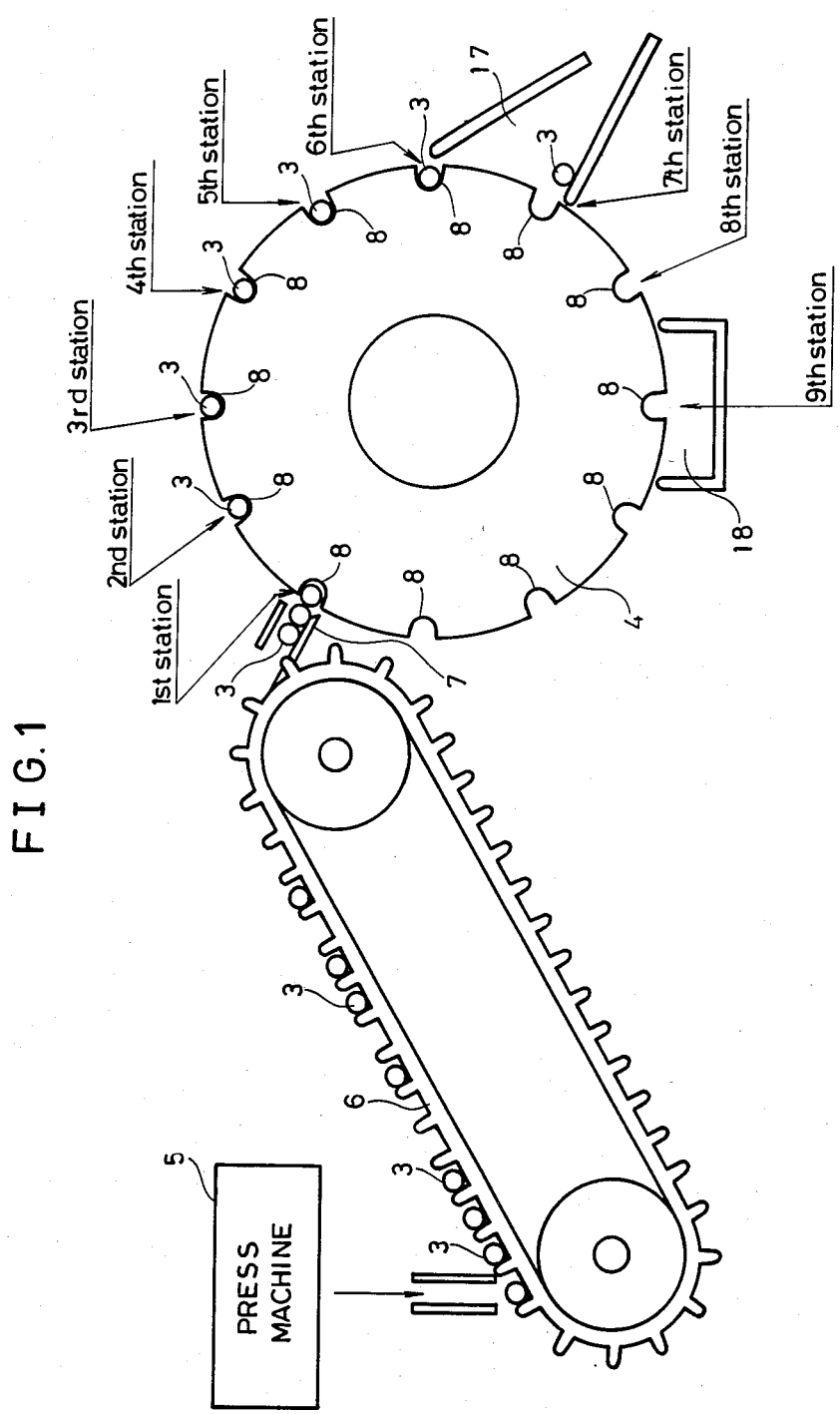
FIG. 1 is a side view of the conveyor apparatus of this invention without showing details of the control means.
Figure 2:
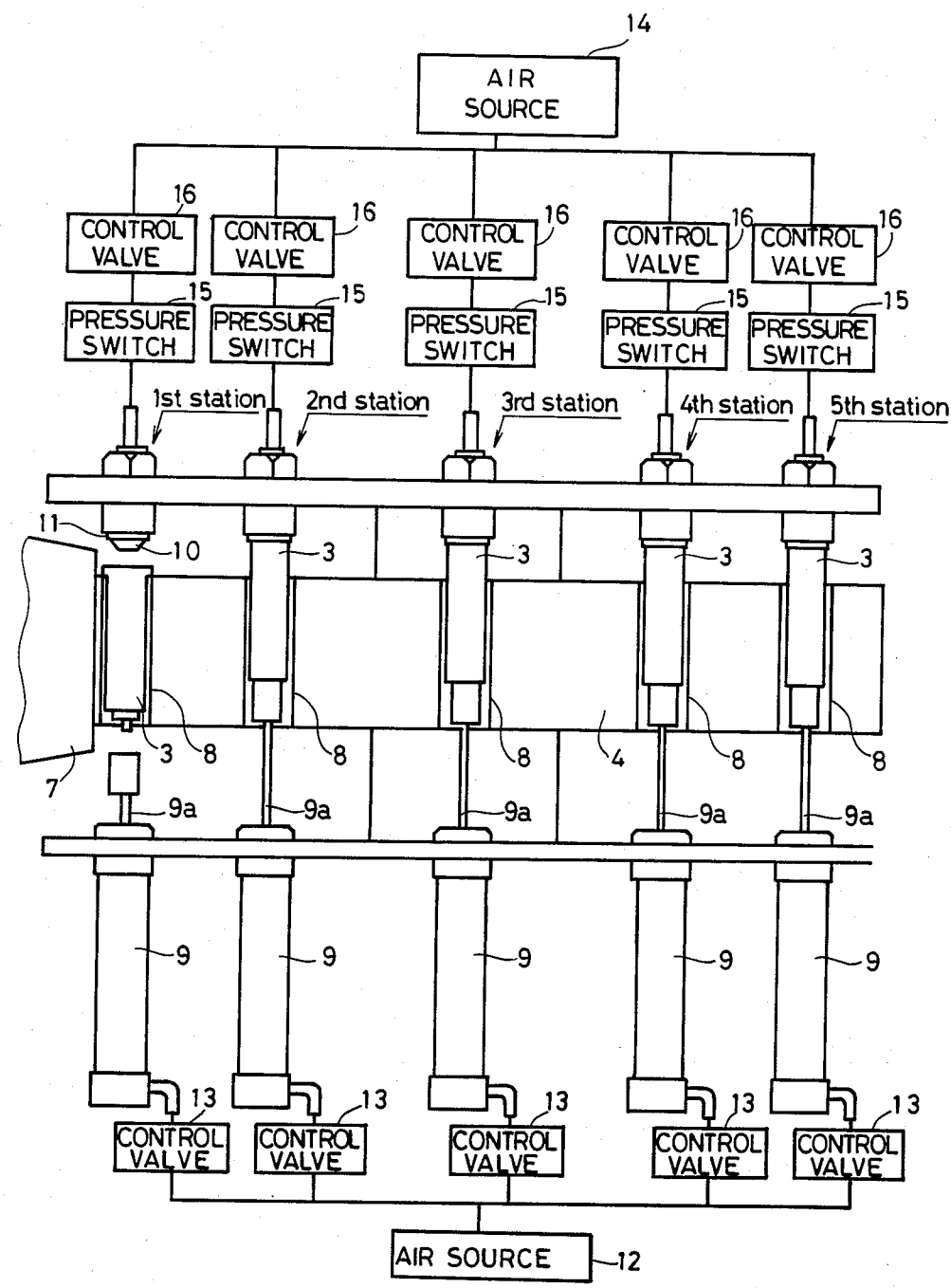
FIG. 2 is a top plan view of the apparatus of FIG. 1 of showing the control means in block form.

FIGS. 1 and 2 show the present battery can hole detecting apparatus including a rotor 4 as a main component thereof. As shown in FIG. 1, battery cans 3 drawn on a press 5 are carried on a feed conveyor 6 to a battery feed port 7, from which the batteries are successively fed onto the outer surface of the rotor 4. Positioning means such as recesses 8 in the circumference of the rotor 4 position the battery cans 3 at predetermined positions on the outer surface of the rotor 4. In this embodiment, a plurality of recesses 8 are formed in the rotor surface and spaced from one another at suitable intervals in the direction of rotation over the entire outer peripheral surface of the rotor 4. Therefore, continuously fed battery cans 3 are successively received in the recesses 8 and travel with the rotation of the rotor 4.

Corresponding to said recesses 8, clamp means in the form of clamping piston cylinder devices 9, 9a are provided for fixing positioned battery cans 3 to prevent the cans from moving relative to the rotor 4. The number of said clamp means is the same as the number of recesses 8 forming the positioning means. In this embodiment, each clamp means, as shown in FIG. 2, comprises a cylinder 9 with a piston rod 9a for pushing the closed end of a battery can 3 into position, and an insert portion 10 adapted to fit into the open end of the battery can 3 for sealing the inner space of the battery can. The cylinders 9 and insert portions 10 rotate with the rotation of the rotor 4. Preferably, each insert portion 10 has an O-ring 11 to improve the quality of sealing of the inner space of the battery can. The cylinders 9 are air cylinders adapted to be operated by air fed thereto from an air source 12. Further, as shown in FIG. 2, solenoid control valves 13 are provided, each disposed in an air circuit connecting the air source 12 and each cylinder 9. Each control valve 13 normally cuts off the circuit but when its solenoid is energized it is actuated to feed air from the air source 12 to the cylinder 9. When air is being fed to the cylinder 9, the piston 9a advances to push and clamp a battery can 3.

Each insert portion 10 has an air inlet port extending therethrough. Air from an air source 14 is introduced into the inner space of the clamped battery can 3 via said air inlet port. Further, as shown, disposed in an air pressure circuit connecting the air source 14 and each insert portion 10, are a pressure switch 15 and a solenoid control valve 16. Each control valve 16 normally cuts off the air pressure circuit but when its solenoid is energized it completes the circuit to introduce air from the air source 14 into the inner space of the battery can 3. Each pressure switch 15 is adapted to be actuated when the pressure of air introduced into the inner space of the battery can 3 reaches a predetermined value. If the battery can 3 has a hole, the pressure of air introduced into the inner space of the battery 3 would not reach the predetermined value. In this case, the pressure switch will not be actuated.

Referring to FIG. 1, battery cans 3 continuously fed onto the outer surface of the rotor 4, are moved with the rotation of the rotor 4 and during this movement a check is made of whether or not a battery can is defective. If it is not leaking, the battery can 3 will be released from the clamp thereon at a first discharge port 17. On the other hand, if it is leaking, the battery can 3 will be released from the clamp thereon at a second discharge port 18. In FIG. 1, first to ninth stations are shown, these stations serving as follows.

First station:

A battery can 3 is fed in by the battery can feed port 7 and the can is received in the recesses 8 of the rotating rotor 4 and positioned therein.

Second station:

The solenoid of the control valve 13 (FIG. 2) is energized, so that the piston 9a of the cylinder 9 is advanced to thereby clamp the battery can 3 in a defined position.

Third station:

The solenoid of the control valve 16 (FIG. 2) is energized to introduce air into the inner space of the battery can 3.

Fourth station:

If the pressure of air introduced into the inner space of a battery can 3 is not less than a predetermined value, the corresponding pressure switch 15 will be actuated. However, if the air pressure is less than the predetermined value, the corresponding pressure switch 15 will not be actuated.

Fifth station:

This station provides an idle-time step.

Sixth station:

If a battery can 3 does not have a hole, the clamp on the battery can 3 is removed at this station. However, if the battery can 3 has a hole, it remains clamped at this station.

Seventh station:

Air is blown from outside against a battery can 3. As a result, if the clamp has been removed, the battery can 3 is discharged outside from the first discharge port 17. However, a battery can 3 which is still clamped will not be discharged at this station but is moved to the successive stations.

Eighth station:

This station provides a further idle-time step.

Ninth station:

The clamp on a defective battery can 3 is removed. Substantially simultaneously therewith, the air inlet port formed in the insert portion 10 blows off air to separate the battery can 3 from the rotor 4.

As can be understood from the above description of operation, the hole detecting apparatus has control means which operates in such a manner that if a pressure switch 15 has been actuated, the clamp on a battery can 3 is removed when the battery can 3 reaches the first discharge port 17, and if the clamp has not been actuated the clamp is removed when the battery can 3 which now travels to the second discharge port 18.

Figure 3:
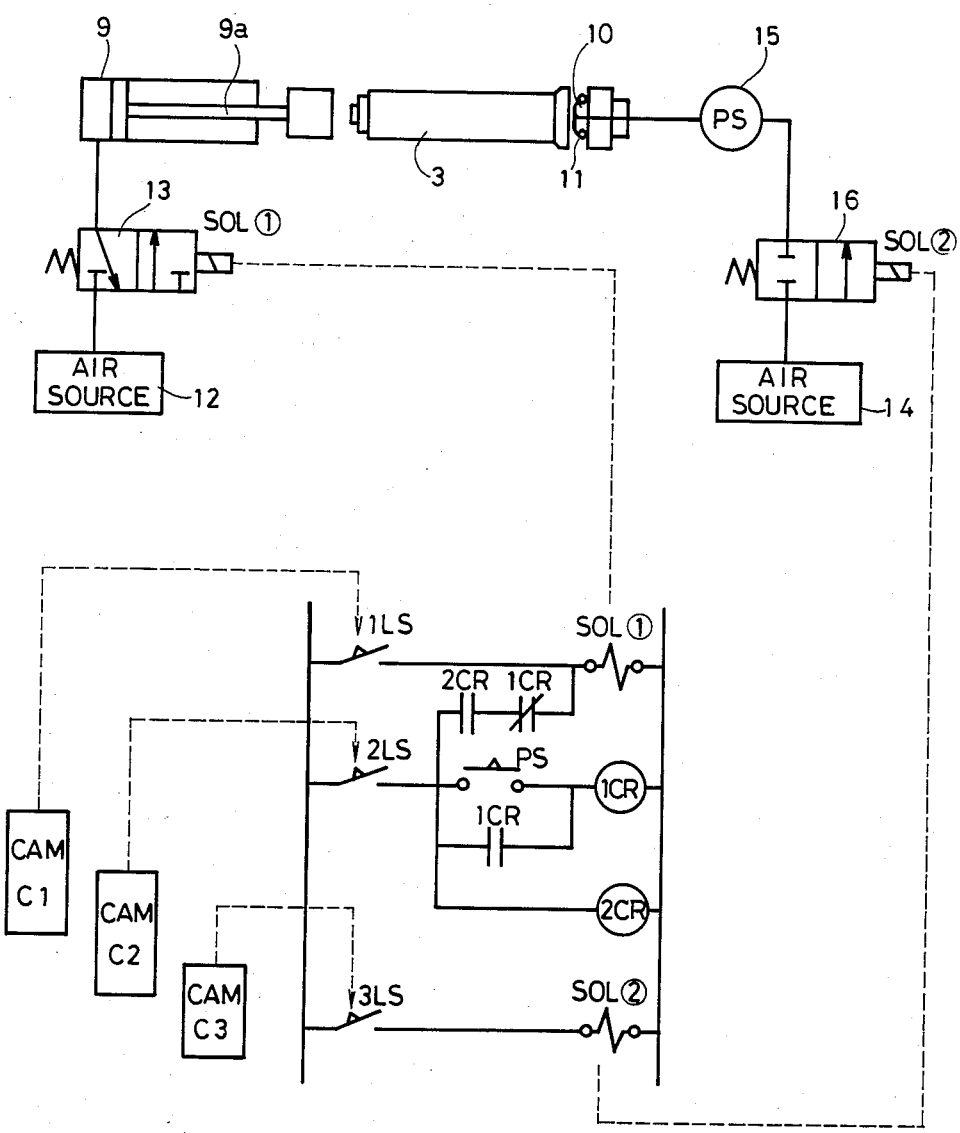
FIG. 3 is a view showing a pneumatic sequence circuit and a contact circuit related thereto which are used in the embodiment of this invention as said control means.
Figure 4:
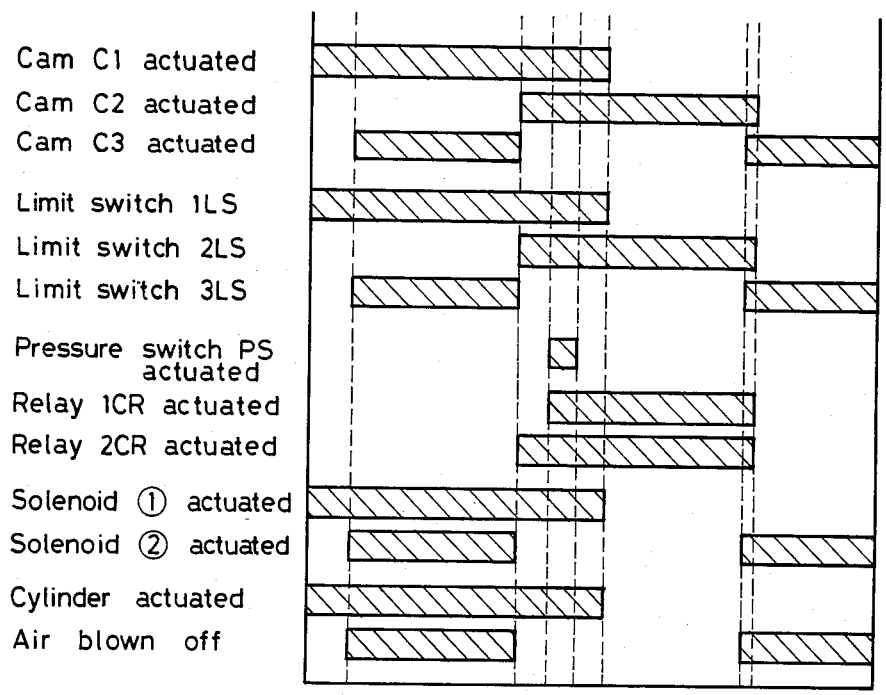
FIG. 4 is a sequence chart for the operation of the apparatus of this invention under the conditions where a battery can does not have any hole.
Figure 5:
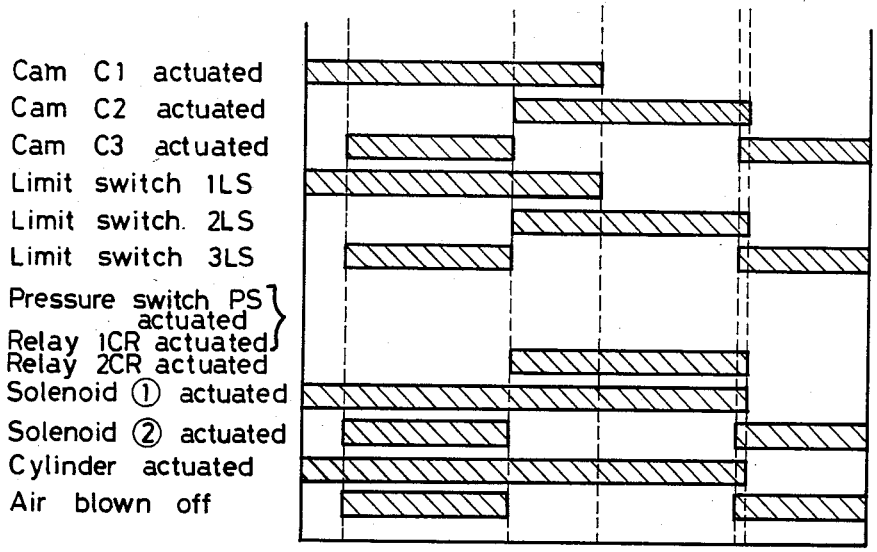
FIG. 5 is a sequence chart showing the operating conditions where a battery can is defective.
Figure 6:
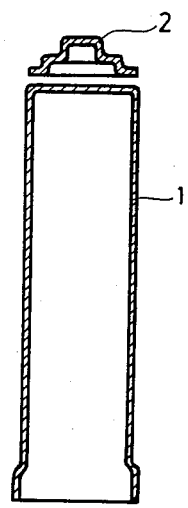
FIG. 6 is a sectional view showing an example of a conventional battery can.
Figure 7:
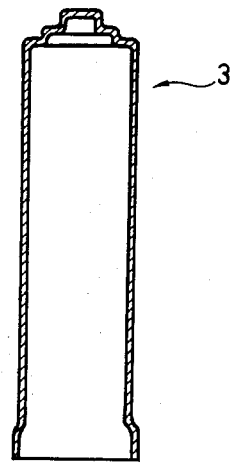
FIG. 7 is a sectional view of an example of an improved battery can.

The details of the control means will now be described with reference to FIGS. 3 to 5. In FIG. 3, a pneumatic sequence circuit and a contact circuit related thereto are shown. In FIGS. 4 and 5, sequence charts are shown. The sequence chart of FIG. 4 illustrates the operating conditions if a battery can 3 is not defective, and FIG. 5 illustrates the operating conditions if a battery can 3 is leaking.

First, using FIGS. 3 and 4, an operation which takes place when a battery can 3 is not defective will be described. The rotor 4 is provided with three cams C1, C2 and C3 associated with the respective clamp control means. As the rotor 4 continues rotation after a battery can 3 has been positioned at the first station, the cam C1 closes a limit switch 1LS, whereupon the solenoid SOL ① of the control valve 13 is energized, introducing air from the air source 12 into the associated cylinder 9 to advance the piston 9a. This is the action that takes place at the second station, clamping the battery can 3.

As the rotor 4 continues rotation, the cam C3 closes a limit switch 3LS. Thereupon, the solenoid SOL ② of the control valve 16 is energized. As a result, the position of the control valve 16 is shifted to introduce air from the air source 14 into the inner space of the battery can 3 through the insert portion 10. This is the action that takes place at the third station. The solenoid SOL ② of the control valve 16 remains energized while the cam C3 is actuating.

As the rotor 4 continues to rotate, the cam C2 closes limit switch 2LS. If the battery can 3 is not defective, the pressure of air introduced into the battery can 3 reaches a value equal to or greater than a predetermined value, so that the pressure switch PS is closed to energize the coil 1CR of the relay, whereby the self-holding, normally open, a-contact 1CR closes, while the normally closed b-contact 1CR opens. It is to be noted that whenever the limit switch 2LS closes, the coil 2CR of the relay is energized to close the a-contact 2CR irrespective of the actuation of the pressure switch PS. This is the action that takes place at the fourth station. Since the actuation of the pressure switch PS results in opening the b-contact 1CR, the solenoid SOL ① of the control valve 13 becomes independent of the limit switch 2LS. Thus, it follows that the solenoid SOL ① of the control valve 13 remains energized during the time the cam C1 is actuated. In other words, during the time the cam C1 is actuated, the piston 9a of the cylinder 9 is pressing the battery can 3. Therefore, if it is so arranged that the actuation of the cam C1 is canceled when the rotor 4 rotates to the sixth station, then at this point of time the clamp on the battery can 3 can be removed.

Referring to FIGS. 3 and 5, an operation which takes place when a battery can 3 is defective will now be described. The pressure of air introduced into the inner space of the battery can 3 does not reach the predetermined value because of the leak. As a result, at the fourth station, the pressure switch does not actuate. Thus, the coil 1CR of the relay is not energized, with the b-contact 1CR remaining closed. On the other hand, when the cam C2 closes the limit switch 2LS, the coil 2CR is energized to close the a-contact 2CR. Therefore, the solenoid SOL ① of the control valve 13 remains energized during the time the cam C1 is actuated plus the time when the cam C2 is actuated. Therefore, if it is so arranged that the actuation of the cam C2 is canceled at the ninth station, then the clamp on the battery can 3 is removed not at the sixth station but at the ninth station. In addition, at the ninth station the cam C3 is actuated again and hence air is blown off from the air inlet port formed in the insert portion 10. The blowing force of the air discharges the battery can 3 into the second discharge port 18 for defective cans.

In this manner, defective battery cans are reliably separated from perfect cans.

The operation described above includes performing the positioning at the first station, performing the clamping at the second station, performing the blowing of air at the third station, and performing the pressure detection at the fourth station. However, the invention is not limited thereto; the aforesaid actions may be performed at any stations on the way from the battery feed port to the discharge port. For example, if time permits, clamping, air blowing, and pressure detection may be performed at the second station.

Although the present invention has been described and illustrated in detail, it is clearly understood that the same is by way of illustrated and example only and is not to be taken by way of limitation, the spirit and scope of the present invention being limited only by the terms of the appended claims.

What is claimed is:

1. An apparatus for detecting and separating defective, leaking battery cans from perfect battery cans made by press drawing, comprising can supply means for providing a substantially continuous flow of cans, rotor means having can receiving and positioning means in its circumferential surface spaced at suitable intervals in said surface, said rotor means being arranged for receiving cans in said can receiving and positioning means from said can supply means, clamping means arranged for cooperation with said can receiving and positioning means for holding a can in a fixed position in said can receiving and positioning means, said clamping means comprising piston cylinder means (9, 9a) including a piston rod for pressing against a closed can end, and an insert portion for insertion into an open can end to hold a can between said piston rod and said insert portion, said insert portion closing an inner space in a can, air introducing means having an air inlet port passing through said insert portion for introducing air under pressure into said inner space in a can, pressure responsive switch means arranged for actuation by a certain air pressure value in said inner space in a can, first can discharge means (17) arranged for discharging perfect cans from said rotor means, second can discharge means (18) arranged downstream of said first can discharge means (17) as viewed in the direction of rotation of said rotor means for discharging defective cans from said rotor means, first control means operable by said pressure responsive switch means for controlling said clamping means to release a perfect can to said first discharge means when said pressure responsive switch means have been actuated for removing said piston rod from said closed can end, whereby air pressure inside said inner space releases a perfect can from said insert portion to said first discharge means (17), and second control means arranged for cooperation with said clamping means when a defective can reaches said second discharge means (18) for removing said piston rod from said closed end of a defective can, and for substantially simultaneously blowing air through said insert portion to release a defective can from said insert portion to said second discharge means.

2. The apparatus of claim 1, wherein said receiving and positioning means comprise recesses formed in the outer circumferential surface of said rotor means.

3. The apparatus of claim 1, wherein said second control means comprise cam means responsive to rotation of said rotor means, and switching means responsive to said cam means for releasing a defective can to said second discharge means (18).

* * * * *